US012633473B2

(12) United States Patent
Ni et al.

(10) Patent No.: US 12,633,473 B2
(45) Date of Patent: May 19, 2026

(54) LONG-STROKE TRIGGER SWITCH WITH INSTANTANEOUS STRUCTURE

(71) Applicant: ZHEJIANG JIABEN ELECTRONICS CO., LTD., Yueqing (CN)

(72) Inventors: Shenglong Ni, Yueqing (CN); Zhibin Zhuo, Yueqing (CN)

(73) Assignee: ZHEJIANG JIABEN ELECTRONICS CO., LTD., Yueqing (CN)

( * ) Notice: Subject to any disclaimer, the term of this patent is extended or adjusted under 35 U.S.C. 154(b) by 0 days.

(21) Appl. No.: 18/029,556

(22) PCT Filed: Dec. 26, 2022

(86) PCT No.: PCT/CN2022/141791

§ 371 (c)(1),
(2) Date: Mar. 30, 2023

(87) PCT Pub. No.: WO2023/231396

PCT Pub. Date: Dec. 7, 2023

(65) Prior Publication Data

US 2025/0087434 A1 Mar. 13, 2025

(30) Foreign Application Priority Data

Jun. 2, 2022 (CN) ......................... 202210624182.4

(51) Int. Cl.
*H01H 13/62* (2006.01)
*H01H 9/22* (2006.01)
*H01H 13/28* (2006.01)

(52) U.S. Cl.
CPC .............. *H01H 13/62* (2013.01); *H01H 9/22* (2013.01); *H01H 13/285* (2013.01)

(58) Field of Classification Search
None
See application file for complete search history.

(56) References Cited

U.S. PATENT DOCUMENTS 4,572,997 A * 2/1986 Yamanobe ............ H01H 9/061 200/522
5,938,009 A * 8/1999 Huang ................ H01H 13/705 200/345

(Continued)

FOREIGN PATENT DOCUMENTS

CN 201022056 2/2008
CN 111091990 5/2020

(Continued)

*Primary Examiner* — Felix O Figueroa
(74) *Attorney, Agent, or Firm* — Workman Nydegger

(57) ABSTRACT

A long-stroke trigger switch with an instantaneous structure. The switch includes a base body, an upper cover and a push shaft, wherein one end of the push shaft is arranged in a box body formed by the base body and the upper cover, and the other end of the push shaft extends out of the box body; a trigger is arranged at the end, extending out of the box body, of the push shaft, and a key and key springs are arranged between the trigger and the box body; a reset spring is arranged on the part, arranged in the box body, of the push shaft; a push shaft insert block is arranged at the end, arranged in the box body, of the push shaft, a movable contact assembly and a binding post assembly matched with the movable contact assembly are arranged below the push shaft insert block.

17 Claims, 7 Drawing Sheets

(56) References Cited

U.S. PATENT DOCUMENTS

| | | | | |
|---|---|---|---|---|
| 7,211,758 | B2 * | 5/2007 | Lui | H01H 1/20<br>200/341 |
| 7,511,240 | B2 * | 3/2009 | Inagaki | H01H 9/063<br>200/522 |
| 9,916,944 | B2 * | 3/2018 | Koyama | H01H 13/14 |
| 10,147,567 | B2 * | 12/2018 | Poon | H01H 13/26 |

FOREIGN PATENT DOCUMENTS

| | | |
|---|---|---|
| CN | 210668151 | 6/2020 |
| CN | 114974968 | 8/2022 |
| JP | H09326217 | 12/2006 |

* cited by examiner

LONG-STROKE TRIGGER SWITCH WITH INSTANTANEOUS STRUCTURE

CROSS-REFERENCE TO RELATED APPLICATION

This application is a 371 of International Patent Application No. PCT/CN2022/141791, filed Dec. 26, 2022, which claims the benefit and priority of Chinese Patent Application No. 202210624182.4, filed Jun. 2, 2022, the disclosures of which are incorporated herein by reference herein in their entirety.

TECHNICAL FIELD

The present disclosure relates to a trigger switch, in particular to a long-stroke trigger switch with an instantaneous structure.

BACKGROUND

The trigger switches on the current market have substantially similar functions, but suffer from the following functional defects.

Firstly, the common trigger switch is generally of a seesaw structure, and the turn-on and turn-off actions are not instantaneous. Therefore, when the switch is just switched on, the contact pressure of the contact is small. If a large current passes through the switch at this moment, the silver contact of the switch is adhered, and in serious cases, the electric tool cannot be disconnected, which does not meet the GB15092.1/EN61058/UL61058 standard and results in significant potential safety hazards.

Secondly, the common trigger switch is generally of an elastic sheet structure, the size of the elastic sheet is not easy to control, and a poor hand feeling of the switch is usually caused, resulting in unsmooth connection and disconnection. In serious cases, the electric tool may be burnt down or even a fire disaster is caused, which also does not meet the GB15092.1/EN61058/UL61058 standard and results in significant potential safety hazards.

Thirdly, the stroke of the common trigger switch is generally less than 5 mm. When a dangerous electric tool is used, the electric tool can be started with a slight press, which does not meet the safety requirements of the electric tool and results in significant safety hazards.

Therefore, it is urgently desired to design a long-stroke trigger switch with an instantaneous structure.

SUMMARY

According to the first aspect of the embodiment of the present disclosure, provided is a long-stroke trigger switch with an instantaneous structure. The trigger switch includes a base body, an upper cover and a push shaft. One end of the push shaft is arranged in a box body formed by the base body and the upper cover, and the other end of the push shaft extends out of the box body.

A trigger is arranged at the end, extending out of the box body, of the push shaft, and a key and key springs are also arranged between the trigger and the box body. A reset spring is arranged on the part, arranged in the box body, of the push shaft.

A push shaft insert block is arranged at the end, arranged in the box body, of the push shaft. A movable contact assembly and a binding post assembly matched with the movable contact assembly are arranged below the push shaft insert block. A middle shaft assembly is arranged between the movable contact assembly and the push shaft insert block. One end of the middle shaft assembly is connected to the movable contact assembly, and the other end of the middle shaft assembly is connected to the push shaft.

The moving contact assembly and the binding post assembly are arranged on the base body.

In one embodiment, the trigger switch also includes a lock-on structure.

The lock-on structure includes a lock shaft, a lock knob spring and a first lock knob. The first lock knob is screwed to the end, extending out of the box body, of the lock shaft. The lock knob spring is arranged at the end, arranged in the box body, of the lock shaft.

A lock shaft through hole is formed in the upper cover. A push shaft lock hole is formed in the push shaft. The lock shaft passing through the lock shaft through hole is arranged in the box body and moves in the push shaft lock hole.

The extension direction of the push shaft is perpendicular to the extension direction of the lock shaft.

In one embodiment, the trigger switch also includes a lock-off structure.

The lock-off structure includes a counter lock support, a counter lock knob spring and a second lock knob. The second lock knob is screwed to the end, extending out of the box body, of the counter lock support. The counter lock knob spring is arranged at the end, arranged in the box body, of the lock shaft.

An upper cover half opening is formed in the upper cover. A part of the structure of the counter lock support is arranged in the upper cover half opening. A clamping groove is formed in the side, close to the base body, of the key. The counter lock support is provided with a fixture block matched with the clamping groove.

The extension direction of the push shaft is perpendicular to the extension direction of the lock shaft.

In one embodiment, the movable contact assembly includes a movable sliding block, a movable contact, a movable contact spring and a movable contact group, the movable contact and the movable contact spring are arranged on the movable sliding block, the movable contact group is arranged on the movable contact, and one end of the middle shaft assembly is connected to the movable sliding block.

The binding post assembly includes binding posts and a static contact group arranged on the binding posts; and the movable contact group is matched with the static contact group.

In one embodiment, the middle shaft assembly includes an outer middle shaft, an inner middle shaft and a middle shaft spring.

An outer middle shaft hole is formed in one end of the outer middle shaft, and one end of the inner middle shaft is installed in the outer middle shaft hole. The middle shaft spring sleeves the outer middle shaft.

A first clamping groove is formed in the other end of the inner middle shaft, and the first clamping groove is internally provided with a first connecting rod. A second clamping groove is formed in the other end of the outer middle shaft, and the second clamping groove is internally provided with a second connecting rod.

A push shaft groove is formed in the bottom of the push shaft insert block, a third clamping groove is formed in the inner side wall of the push shaft groove, and both ends of the first connecting rod are respectively clamped in the third clamping groove. A movable sliding block groove is formed in the top of the movable sliding block, a fourth clamping groove is formed in the inner side wall of the movable sliding groove, and both ends of the second connecting rod are respectively clamped in the fourth clamping groove.

In one embodiment, the switch also includes a first metal sheet arranged between the bottom of the movable sliding block and the base body, and the movable sliding block can slide on the first metal sheet.

The movable contact assembly also includes a second metal sheet, and the second metal sheet can slide in the clamping groove of the movable sliding block.

The first metal sheet is arranged on the base body. The movable sliding block is provided with a connecting column, and the second metal sheet is arranged on the movable sliding block through the connecting column.

In one embodiment, a third metal sheet is arranged between the top of the push shaft insert block and the upper cover, and the push shaft insert block can slide on the third metal sheet.

The third metal sheet is arranged on the upper cover.

In one embodiment, a second metal sheet groove is formed in the bottom of the second metal sheet, the movable sliding block is provided with a first connecting position, and the second metal sheet groove is arranged on the first connecting position.

A movable contact groove is formed in the bottom of the movable contact, the movable sliding block is provided with a second connecting position, and the movable contact groove is arranged on the second connecting position.

In one embodiment, two base body through holes are formed in the base body and at the positions corresponding to the binding posts, and a fastener passes through the base body through holes to fix the binding posts on the base body.

A partition plate is arranged between the two base body through holes, and the partition plate is configured to separate the two wires.

In one embodiment, a fixture block is arranged on the base body and at the position close to the push shaft, and a clamping groove matched with the fixture block is formed in the trigger.

In one embodiment, a base body semi-circular hole is formed in the base body. An upper cover semi-circular hole is formed in the upper cover. The base body semi-circular hole and the upper cover semi-circular hole form a push shaft through hole. The push shaft extends out of the box body through the push shaft through hole.

The base body is provided with a plurality of clamping blocks, a plurality of clamping holes are formed in the upper cover, and the number and positions of the clamping blocks correspond to those of the clamping holes respectively.

A positioning column is also arranged between the end, arranged in the box body, of the push shaft and the upper cover, and the reset spring is arranged on the positioning column.

A seal ring is arranged around the push shaft in the box body.

Compared with the prior art, the present disclosure has the following technical effects.

The long-stroke trigger switch with an instantaneous structure provided by the present disclosure is provided with an instantaneous structure, so that the contact pressure of the contact is relatively large when the switch is just switched on and cannot be changed along with the change of the travel of the switch. When a large current passes through the switch, the silver contact of the switch is not adhered, and the switch can be instantaneous due to such structure. In addition, in the embodiment, the key and the key springs are arranged between the trigger and the box to increase the stroke of the switch by 1.8 mm, and the switch has a stroke of more than 4.6 mm when being turned on, so that the stroke of the switch in the embodiment of the present disclosure exceeds 6.4 mm. Furthermore, the switch is novel in structure and simple in process, is suitable for large-scale electric tools and electric garden tools such as alternating-current and direct-current DC angle polishers, profile cutters, aluminum cutting machines, electric circular saws, electric hammers, electric picks and electric chain saws, and meets the national safety standards.

Figure 1:
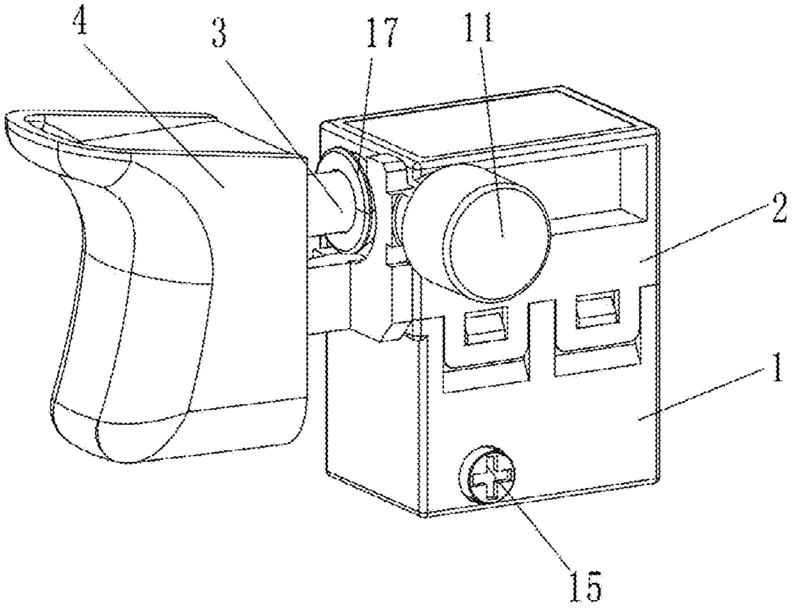
FIG. 1 is a solid diagram of a long-stroke trigger switch with an instantaneous structure in the present disclosure.

Reference signs: 1, base body; 2, upper cover; 3, push shaft; 4, trigger; 5, key spring; 6, reset spring; 7, movable contact assembly; 8, binding post assembly; 9, middle shaft assembly; 11, lock-on structure; 12, first metal sheet; 13, second metal sheet; 14, third metal sheet; 15, fastener; 16, positioning column; 17, seal ring; 31, push shaft insert block; 32, push shaft lock hole; 33, push shaft groove; 34, third clamping groove; 41, key; 42, cylinder; 43, clamping groove; 71, movable sliding block; 711, movable sliding block groove; 712, fourth clamping groove; 713, connecting column; 714, first connecting position; 715, second connecting position; 72, movable contact; 721, movable contact groove; 73, movable contact spring; 74, movable contact group; 81, binding post; 82, static contact group; 91, outer middle shaft; 911, outer middle shaft hole; 912, second clamping groove; 92, inner middle shaft; 921, first clamping groove; 93, middle shaft spring; 94, first connecting rod; 95, second connecting rod; 111, self-lock shaft; 111D, counter lock support; 112, lock knob spring; 112D, counter lock knob spring; 113, first lock knob; 113D, first lock knob; 131, second metal sheet groove; 101, base body through hole; 102, fixture block; 103, base body semi-circular hole; 104, clamping block; 105, rib position; 201, lock shaft through hole; 201D, upper cover half opening; 202, upper cover semi-circular hole; 203, clamping hole; and 1111, clamping boss.

DETAILED DESCRIPTION OF THE EMBODIMENTS

The present disclosure is described in detail in conjunction with the attached figures and specific embodiments. It needs to be noted that the described embodiments are only intended to explain the present disclosure, but not to limit the present disclosure.

The orientations described in the present application, such as upper, lower, left, right directions, are used for convenience of description with reference to the attached figures, but are not intended to limit the protection scope of the present disclosure.

As shown in FIG. 1 to FIG. 4, a long-stroke trigger switch with an instantaneous structure provided by the embodiment includes a base body 1, an upper cover 2 and a push shaft 3. One end of the push shaft 3 is arranged in a box body formed by the base body 1 and the upper cover 2, and the other end of the push shaft 3 extends out of the box body.

A trigger 4 is arranged at the end, extending out of the box body, of the push shaft 3, and a key 41 and key springs 5 are also arranged between the trigger 4 and the box body. A reset spring 6 is arranged on the part, arranged in the box body, of the push shaft 3.

A push shaft insert block 31 is arranged at the end, arranged in the box body, of the push shaft 3. A movable contact assembly 7 and a binding post assembly 8 matched with the movable contact assembly 7 are arranged below the push shaft insert block 3. A middle shaft assembly 9 is arranged between the movable contact assembly 7 and the push shaft insert block 31. One end of the middle shaft assembly 9 is connected to the movable contact assembly 7, and the other end of the middle shaft assembly 9 is connected to the push shaft 3.

The moving contact assembly 7 and the binding post assembly are arranged on the base body 1.

The long-stroke trigger switch with an instantaneous structure provided by the present disclosure is provided with an instantaneous structure, so that the contact pressure of the contact is relatively large when the switch is just switched on and cannot be changed along with the change of the travel of the switch. When a large current passes through the switch, the silver contact of the switch is not adhered, and the switch can be instantaneous due to such structure. In addition, in the embodiment, the key and the key springs are arranged between the trigger and the box to increase the stroke of the switch by 1.8 mm, and the switch has a stroke of more than 4.6 mm when being turned on, so that the stroke of the switch in the embodiment exceeds 6.4 mm. Furthermore, the switch is novel in structure and simple in process, is suitable for large-scale electric tools and electric garden tools such as alternating-current and direct-current DC angle polishers, profile cutters, aluminum cutting machines, electric circular saws, electric hammers, electric picks and electric chain saws, and meets the national safety standards.

Figure 4:
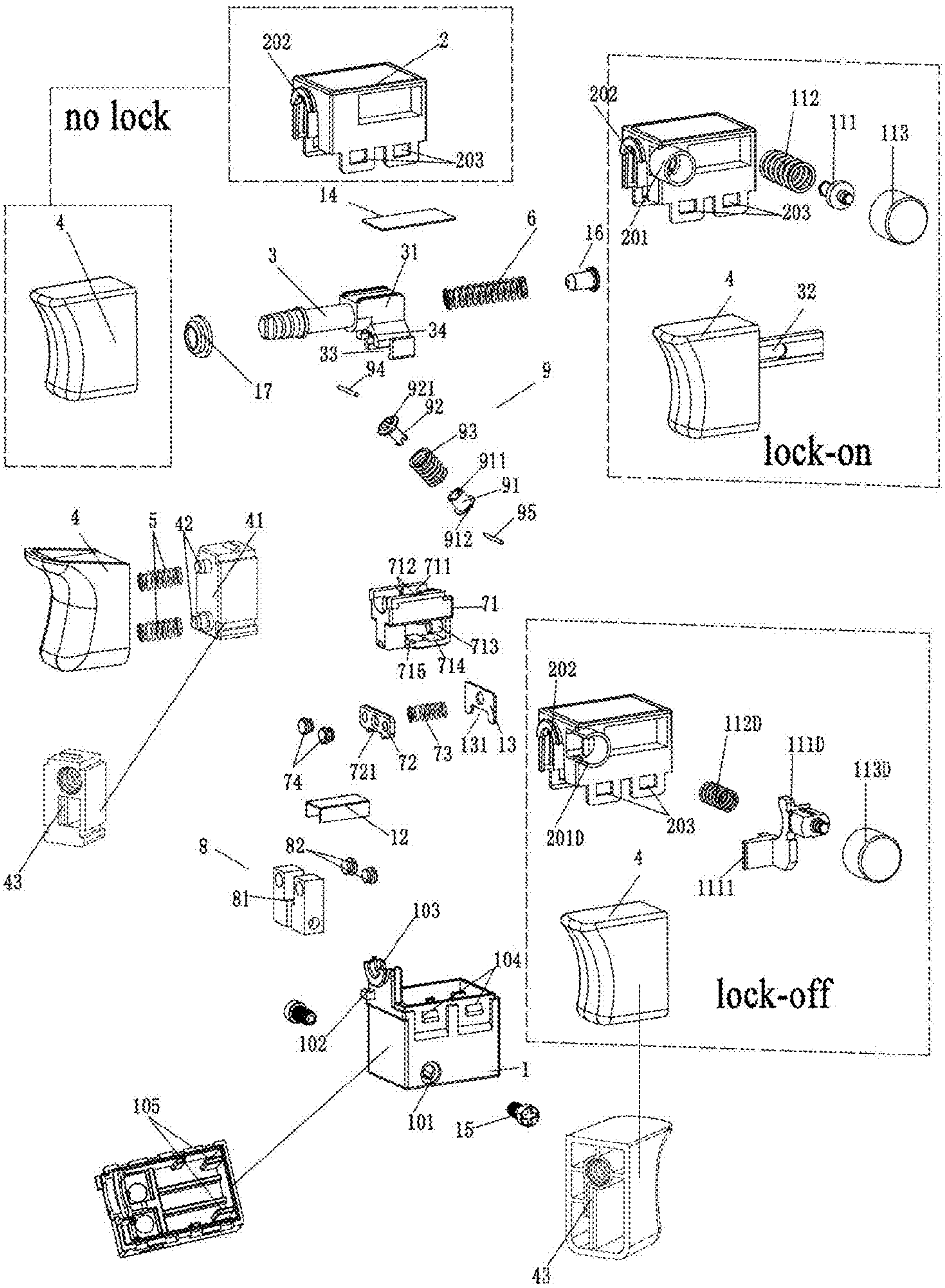
FIG. 4 is an explosive view of a long-stroke trigger switch with an instantaneous structure in the present disclosure.

In one embodiment, as shown in FIG. 4, the key 41 is also arranged between the trigger 4 and the push shaft 3. Two cylinders 42 are arranged on the key 41, and the two key springs 5 are respectively arranged on the cylinders 42.

As shown in FIG. 1, FIG. 4 and FIGS. 8A and 8B, the trigger switch also includes a lock-on structure 11.

In one implementation method, the lock-on structure 11 includes a lock shaft 111, a lock knob spring 112 and a first lock knob 113. The first lock knob 113 is screwed to the end, extending out of the box body, of the lock shaft 111. The lock knob spring 112 is arranged at the end, arranged in the box body, of the lock shaft 111.

A lock shaft through hole 201 is formed in the upper cover 2. A push shaft lock hole 32 is formed in the push shaft 4. The lock shaft 111 passing through the lock shaft through hole 201 is arranged in the box body and moves in the push shaft lock hole 32.

The structure provided by the embodiment can make the switch in the embodiment have a lock-on function.

In the other implementation method, as shown in FIG. 4, a lock-off structure 11 includes a counter lock support 111D, a counter lock knob spring 112D and a second lock knob 113D. The second lock knob 113D is screwed to the end, extending out of the box body, of the counter lock support 111D. The counter lock knob spring 112D is arranged at the end, arranged in the box body, of the counter lock support 111D.

An upper cover half opening 201D is formed in the upper cover 2. A part of the structure of the counter lock support 111D is arranged in the upper cover half opening 201D. A clamping groove 43 is formed in the side, close to the base body, of the key 41. The counter lock support 111D is provided with a clamping boss 1111 matched with the clamping groove 43.

In the embodiment, the clamping groove 43 is formed in the side, close to the base body, of the key 41, and the counter lock support 111D is provided with the clamping boss 1111, so that the switch in the embodiment has a lock-off function.

It needs to be noted that the extension direction of the push shaft 3 in the embodiment is perpendicular to the extension direction of the lock shaft 111.

As shown in FIG. 2 to FIG. 5, the movable contact assembly 7 includes a movable sliding block 71, a movable contact 72, a movable contact spring 73 and a movable contact group 74, the movable contact 72 and the movable contact spring 73 are arranged on the movable sliding block 71, the movable contact group 74 is arranged on the movable contact 72, and one end of the middle shaft assembly 9 is connected to the movable sliding block 71.

The binding post assembly 8 includes binding posts 81 and a static contact group 82 arranged on the binding posts 81. The movable contact group 74 is matched with the static contact group 82.

Figure 5:
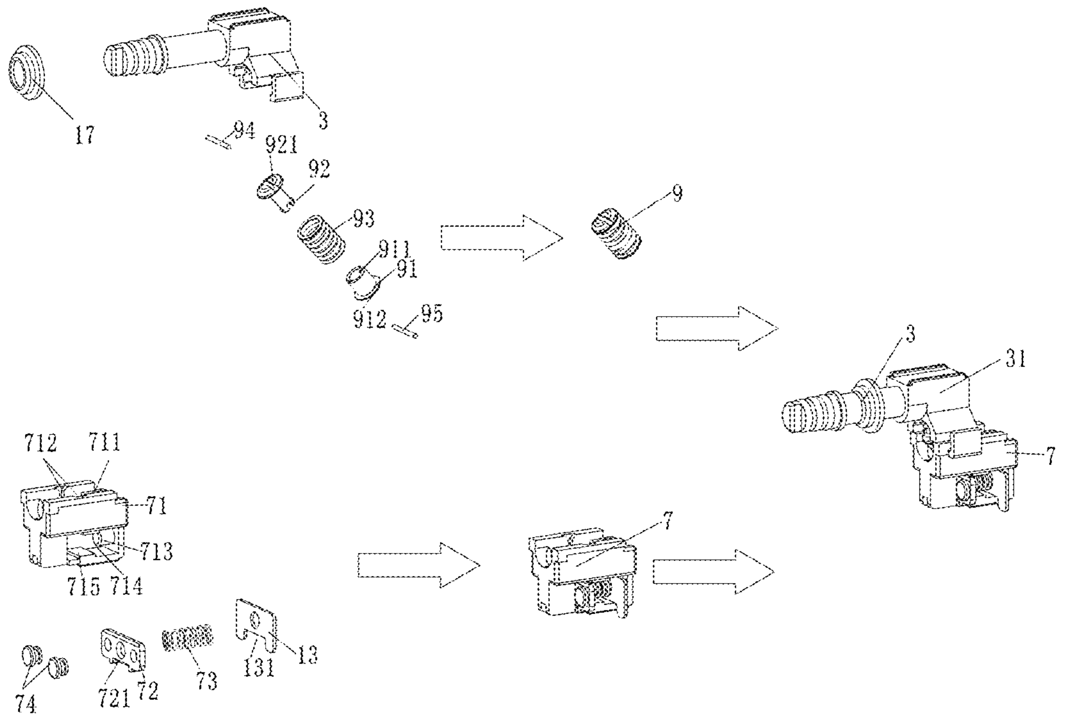
FIG. 5 is an assembly diagram of the movable contact sliding block of a long-stroke trigger switch with an instantaneous structure in the present disclosure.

As shown in FIG. 4 and FIG. 5, the middle shaft assembly 9 includes an outer middle shaft 91, an inner middle shaft 92 and a middle shaft spring 93.

An outer middle shaft hole 911 is formed in one end of the outer middle shaft 91, and one end of the inner middle shaft 92 is installed in the outer middle shaft hole 911. The middle shaft spring 93 sleeves the outer middle shaft 91.

A first clamping groove 921 is formed in the other end of the inner middle shaft 92, and the first clamping groove 921 is internally provided with a first connecting rod 94. A second clamping groove 912 is formed in the other end of the outer middle shaft 91, and the second clamping groove 912 is internally provided with a second connecting rod 95.

A push shaft groove 33 is formed in the bottom of the push shaft insert block 31, a third clamping groove 34 is formed in the inner side wall of the push shaft groove 33, and both ends of the first connecting rod 94 are respectively clamped in the third clamping groove 34. A movable sliding block groove 711 is formed in the top of the movable sliding block 71, a fourth clamping groove 712 is formed in the inner side wall of the movable sliding groove 711, and both ends of the second connecting rod 95 are respectively clamped in the fourth clamping groove 712.

Figure 2:
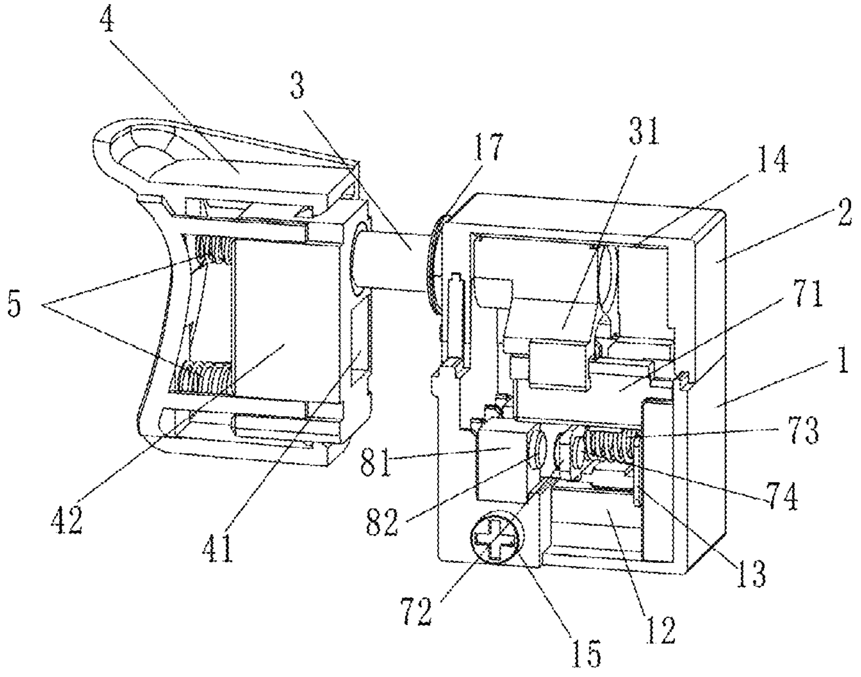
FIG. 2 is a part sectioned view of a trigger position and contact positions when the switch is disconnected in FIG. 1.
Figure 3:
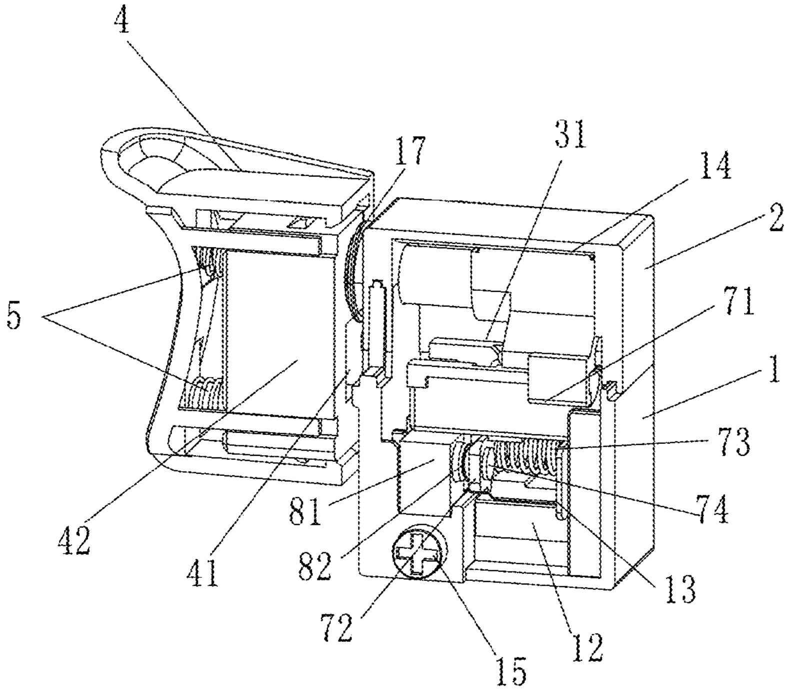
FIG. 3 is a part sectioned view of a trigger position and contact positions when the switch is closed in FIG. 1.

As shown in FIG. 2 to FIG. 4, the switch also includes a first metal sheet 12 arranged between the bottom of the movable sliding block 71 and the base body 1, and the movable sliding block 71 can slide on the first metal sheet 12.

The movable contact assembly 7 also includes a second metal sheet 13, and the second metal sheet 13 can slide on the connecting column 713 of the movable sliding block.

The first metal sheet 12 is arranged on the base body 1. The movable sliding block 71 is provided with a connecting column 711, and the second metal sheet 13 is arranged in the movable sliding block 71 through the connecting column 713 and can move left and right.

In the embodiment, the first metal sheet is arranged between the movable sliding block and the base body. The friction between plastics between the movable sliding block and the plastic base body is converted into the friction between plastic and metal between the movable sliding block and the first metal sheet, and the high smoothness of the surface of the first metal sheet is used to reduce the friction coefficient, increase the agility of the movable sliding block moving left and right, so that the switch can be turned on and off instantly. The second metal sheet is arranged on the movable sliding block, and the second metal sheet is pressed against two base body rib positions 105 in the base body 1, so that the movable contact spring 73 is in a compressed state to provide a reset auxiliary force for the movable sliding block 71.

As shown in FIG. 2 to FIG. 4, a third metal sheet 14 is arranged between the top of the push shaft insert block 31 and the upper cover 2, and the push shaft insert block 31 can slide on the third metal sheet 14.

The third metal sheet 14 is arranged on the upper cover 2.

The third metal sheet is arranged between the push shaft insert block and the upper cover, and the high smoothness of the surface of the third metal sheet is used to convert the friction between plastics between the push shaft insert block and the upper cover into the friction between plastic and metal between the push shaft insert block and the third metal sheet, so that the friction coefficient is reduced, and the agility of the push shaft insert block moving left and right is increased.

As shown in FIG. 4 and FIG. 5, a second metal sheet groove 131 is formed in the bottom of the second metal sheet 13, the movable sliding block 71 is provided with a first connecting position 714, and the second metal sheet groove 131 is arranged on the first connecting position 714.

A movable contact groove 721 is formed in the bottom of the movable contact 72, the movable sliding block 71 is provided with a second connecting position 715, and the movable contact groove 721 is arranged on the second connecting position 715.

Figure 7:
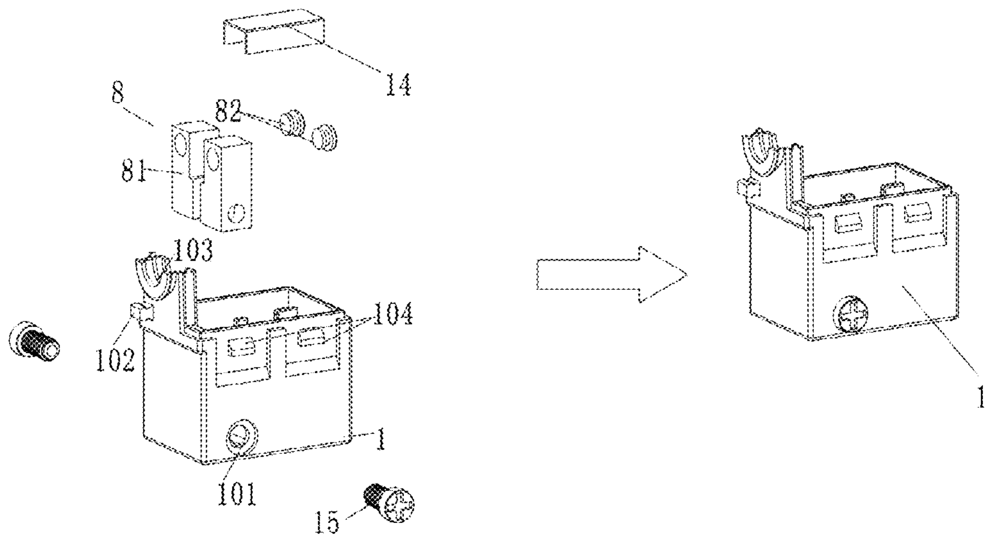
FIG. 7 is an assembly diagram of the base assembly of a long-stroke trigger switch with an instantaneous structure in the present disclosure.
Figure 8A:
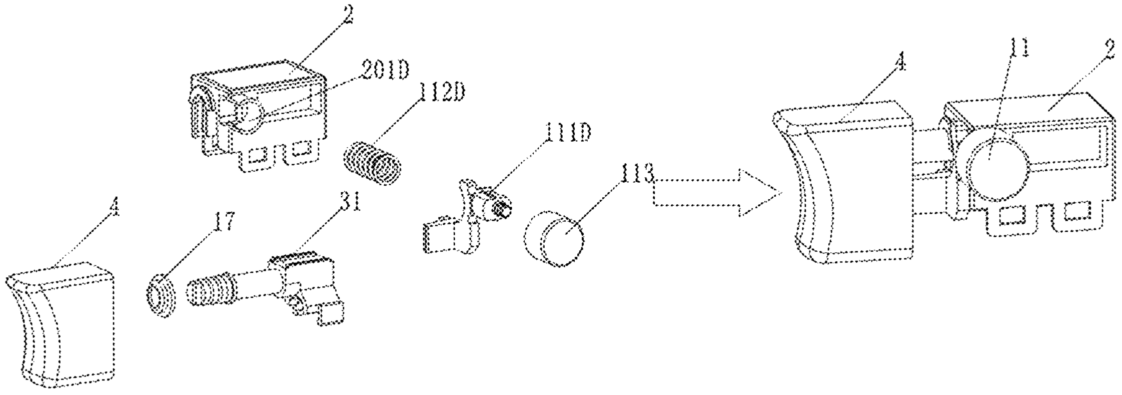
FIGS. 8A and 8B are assembly diagrams of the upper cover assembly of a long-stroke trigger switch with an instantaneous structure in the present disclosure.
Figure 8B:
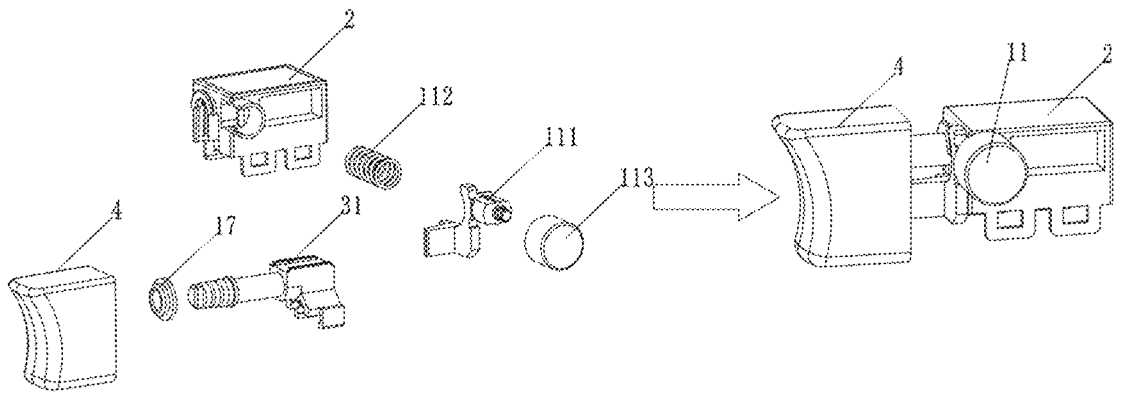

As shown in FIG. 7, two base body through holes 101 are formed in the base body 1 and at the positions corresponding to the binding posts 81, and a fastener 15 passes through the base body through holes 101 to fix the binding posts 81 on the base body 1.

In the embodiment, a partition plate is arranged between the two base body through holes 101 to separate the two binding posts 81, so that the creepage distance can be increased.

Figure 6:
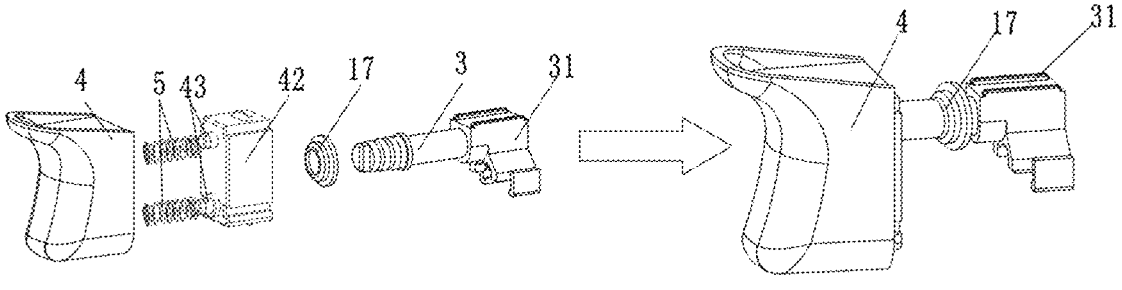
FIG. 6 is an assembly diagram of the trigger and the push shaft of a long-stroke trigger switch with an instantaneous structure in the present disclosure.

As shown in FIG. 4 and FIG. 6, a fixture block 102 is arranged on the base body 1 and at the position close to the push shaft 3, and a clamping groove matched with the fixture block 102 is formed in the counter lock support 111D to play a guiding role.

As shown in FIG. 4 and FIG. 7, a base body semi-circular hole 103 is formed in the base body 1, an upper cover semi-circular hole 202 is formed in the upper cover 2, the base body semi-circular hole 103 and the upper cover semi-circular hole 202 form a push shaft through hole, and the push shaft 3 extends out of the box body through the push shaft through hole.

The base body 1 is provided with a plurality of clamping blocks 104, a plurality of clamping holes 203 are formed in the upper cover 2, and the number and positions of the clamping blocks 203 correspond to those of the clamping holes 104 respectively.

A positioning column 16 is also arranged between the end, arranged in the box body, of the push shaft 3 and the upper cover 2, and the reset spring 6 is arranged on the positioning column 16.

A seal ring 17 is arranged around the push shaft 3 in the box body.

The working process of the long-stroke trigger switch with an instantaneous structure provided by the present disclosure to realize the on-off function is as follows.

When the trigger 4 is pressed, the trigger 4 slides on the key 41. When the trigger 4 makes contact with the key 41, the key 41 is driven to drive the push shaft 3 to move to the right. In the process, the movable sliding block 71 can quickly jump to the left under the action of the middle shaft spring 9, so that the movable contact group 74 on the movable contact 72 makes contact with the static contact group on the binding posts 81, the instantaneous turn-on function of the switch is realized, and the middle shaft axis spring 53 is compressed at the same time.

When the trigger 4 is released, the middle shaft spring 93 and the reset spring 5 are reset simultaneously, the movable sliding block is driven to jump to the right, and then the movable contact group 74 on the movable contact 72 is disconnected from the static contact group 82 on the binding posts 81, so that the turn-off function of the switch is realized.

The working process of the long-stroke trigger switch with an instantaneous structure provided by the present disclosure to realize the lock-on function is as follows.

When the trigger 4 is pressed, the trigger 4 drives the push shaft 3 to slide to the right, thus driving the lock shaft 111 to move in the push shaft lock hole 32. When the trigger 4 is pressed to the bottom, the first lock knob 113 is pressed and then the trigger 4 is released. At this time, the trigger 4 is hooked so that the push shaft 3 cannot move under the cooperation of the lock shaft 111 and the push shaft lock hole 32, thus realizing the lock-on function of the switch.

When the trigger 4 is pressed again and then released, the first lock knob 113 automatically bounces off under the action of the lock knob spring 112. The lock shaft 111 and the push shaft lock hole 32 are unlocked. The first lock knob 113 is reset under the action of the lock knob spring 112. The lock shaft 111 is separated from the push shaft lock hole 32, and the switch is reset freely.

The working process of the long-stroke trigger switch with an instantaneous structure provided by the present disclosure to realize the lock-off function is as follows.

Without pressing the switch, the clamping boss 1111 on the counter lock support 111D abuts against the clamping groove 43 on the key 41, and the trigger 4 cannot be pressed. Firstly, the second lock knob 113D is pressed, and the clamping boss 1111 on the counter lock support 111D is misaligned with the clamping groove 43 on the key 41, and then the trigger 4 is pressed, so that the trigger 4 can be pressed, and the switch is turned on. When the trigger 4 is released, the switch is turned off, the counter lock support 111D is reset under the action of the counter lock knob spring 112D.

Finally, it should be noted that the above-mentioned embodiments are only used for illustrating the technical scheme of the present disclosure but not restricting the scope of protection of the present disclosure; although the present disclosure is described in detail by reference to a better embodiment, those ordinary skilled in the art should understand that the technical scheme of the present disclosure can be amended or equally substituted but not departing from the substance and scope of the technical scheme of the present disclosure.

What is claimed is:

1. A long-stroke trigger switch with an instantaneous structure, comprising a base body, an upper cover and a push shaft, wherein one end of the push shaft is arranged in a box body formed by the base body and the upper cover, and another end of the push shaft extends out of the box body;

wherein a trigger is arranged at the end, extending out of the box body, of the push shaft, and a key and key springs are also arranged between the trigger and the box body; a reset spring is arranged on a part, arranged in the box body, of the push shaft;

wherein a push shaft insert block is arranged at the end, arranged in the box body, of the push shaft, a movable contact assembly and a binding post assembly matched with the movable contact assembly are arranged below the push shaft insert block, a middle shaft assembly is arranged between the movable contact assembly and the push shaft insert block, one end of the middle shaft assembly is connected to the movable contact assembly, and an other end of the middle shaft assembly is connected to the push shaft;

wherein the movable contact assembly and the binding post assembly are arranged on the base body;

wherein the movable contact assembly comprises a movable sliding block, a movable contact, a movable contact spring and a movable contact group, the movable contact and the movable contact spring are arranged on the movable sliding block, the movable contact group is arranged on the movable contact, and said one end of the middle shaft assembly is connected to the movable sliding block; and wherein the binding post assembly comprises binding posts and a static contact group arranged on the binding posts; and the movable contact group is matched with the static contact group.

2. The long-stroke trigger switch with an instantaneous structure according to claim 1, wherein the trigger switch also comprises a lock-on structure;

wherein the lock-on structure comprises a lock shaft, a lock knob spring and a first lock knob, the first lock knob is screwed to the end, extending out of the box body, of the lock shaft, and the lock knob spring is arranged at the end, arranged in the box body, of the lock shaft;

wherein a lock shaft through hole is formed in the upper cover, a push shaft lock hole is formed in the push shaft, and the lock shaft passing through the lock shaft through hole is arranged in the box body and moves in the push shaft lock hole; and wherein the extension direction of the push shaft is perpendicular to the extension direction of the lock shaft.

3. The long-stroke trigger switch with an instantaneous structure according to claim 1, wherein the trigger switch also comprises a lock-off structure;

wherein the lock-off structure comprises a counter lock support, a counter lock knob spring and a second lock knob, the second lock knob is screwed to the end, extending out of the box body, of the counter lock support, and the counter lock knob spring is arranged at the end, arranged in the box body, of the lock shaft;

wherein an upper cover half opening is formed in the upper cover, a part of the structure of the counter lock support is arranged in the upper cover half opening, a clamping groove is formed in the side, close to the base body, of the key, and the counter lock support is provided with a fixture block matched with the clamping groove; and wherein the extension direction of the push shaft is perpendicular to the extension direction of the lock shaft.

4. The long-stroke trigger switch with an instantaneous structure according to claim 1, wherein the middle shaft assembly comprises an outer middle shaft, an inner middle shaft and a middle shaft spring;

wherein an outer middle shaft hole is formed in one end of the outer middle shaft, and one end of the inner middle shaft is installed in the outer middle shaft hole; the middle shaft spring sleeves the outer middle shaft;

wherein a first clamping groove is formed in the other end of the inner middle shaft, and the first clamping groove is internally provided with a first connecting rod; a second clamping groove is formed in the other end of the outer middle shaft, and the second clamping groove is internally provided with a second connecting rod; and wherein a push shaft groove is formed in the bottom of the push shaft insert block, a third clamping groove is formed in the inner side wall of the push shaft groove, and both ends of the first connecting rod are respectively clamped in the third clamping groove; a movable sliding block groove is formed in the top of the movable sliding block, a fourth clamping groove is formed in the inner side wall of the movable sliding groove, and both ends of the second connecting rod are respectively clamped in the fourth clamping groove.

5. The long-stroke trigger switch with an instantaneous structure according to claim 1, wherein the switch also comprises a first metal sheet arranged between the bottom of the movable sliding block and the base body, and the movable sliding block can slide on the first metal sheet;

wherein the movable contact assembly also comprises a second metal sheet, and the second metal sheet can slide in the clamping groove of the movable sliding block; and wherein the first metal sheet is arranged on the base body; and the movable sliding block is provided with a connecting column, and the second metal sheet is arranged in the movable sliding block through the connecting column.

6. The long-stroke trigger switch with an instantaneous structure according to claim 1, wherein a third metal sheet is arranged between the top of the push shaft insert block and the upper cover, and the push shaft insert block can slide on the third metal sheet; and wherein the third metal sheet is arranged on the upper cover.

7. The long-stroke trigger switch with an instantaneous structure according to claim 5, wherein a second metal sheet groove is formed in the bottom of the second metal sheet, the movable sliding block is provided with a first connecting position, and the second metal sheet groove is arranged on the first connecting position; and wherein a movable contact groove is formed in the bottom of the movable contact, the movable sliding block is provided with a second connecting position, and the movable contact groove is arranged on the second connecting position.

8. The long-stroke trigger switch with an instantaneous structure according to claim 1, wherein two base body through holes are formed in the base body and at the positions corresponding to the binding posts, and a fastener passes through the base body through holes to fix the binding posts on the base body.

9. The long-stroke trigger switch with an instantaneous structure according to claim 1, wherein a base body semi-circular hole is formed in the base body, an upper cover semi-circular hole is formed in the upper cover, the base body semi-circular hole and the upper cover semi-circular hole form a push shaft through hole, and the push shaft extends out of the box body through the push shaft through hole;

wherein the base body is provided with a plurality of clamping blocks, a plurality of clamping holes are formed in the upper cover, and the number and positions of the clamping blocks correspond to those of the clamping holes respectively; and wherein a positioning column is also arranged between the end, arranged in the box body, of the push shaft and the upper cover, and the reset spring is arranged on the positioning column.

10. The long-stroke trigger switch with an instantaneous structure according to claim 4, wherein the middle shaft assembly comprises an outer middle shaft, an inner middle shaft and a middle shaft spring, wherein an outer middle shaft hole is formed in one end of the outer middle shaft, and one end of the inner middle shaft is installed in the outer middle shaft hole; the middle shaft spring sleeves the outer middle shaft, wherein a first clamping groove is formed in the other end of the inner middle shaft, and the first clamping groove is internally provided with a first connecting rod, wherein a second clamping groove is formed in the other end of the outer middle shaft, and the second clamping groove is internally provided with a second connecting rod, wherein a push shaft groove is formed in the bottom of the push shaft insert block, a third clamping groove is formed in the inner side wall of the push shaft groove, and both ends of the first connecting rod are respectively clamped in the third clamping groove, and wherein a movable sliding block groove is formed in the top of the movable sliding block, a fourth clamping groove is formed in the inner side wall of the movable sliding groove, and both ends of the second connecting rod are respectively clamped in the fourth clamping groove.

11. The long-stroke trigger switch with an instantaneous structure according to claim 5, wherein the middle shaft assembly comprises an outer middle shaft, an inner middle shaft and a middle shaft spring, wherein an outer middle shaft hole is formed in one end of the outer middle shaft, and one end of the inner middle shaft is installed in the outer middle shaft hole; the middle shaft spring sleeves the outer middle shaft, wherein a first clamping groove is formed in the other end of the inner middle shaft, and the first clamping groove is internally provided with a first connecting rod, wherein a second clamping groove is formed in the other end of the outer middle shaft, and the second clamping groove is internally provided with a second connecting rod, wherein a push shaft groove is formed in the bottom of the push shaft insert block, a third clamping groove is formed in the inner side wall of the push shaft groove, and both ends of the first connecting rod are respectively clamped in the third clamping groove, and wherein a movable sliding block groove is formed in the top of the movable sliding block, a fourth clamping groove is formed in the inner side wall of the movable sliding groove, and both ends of the second connecting rod are respectively clamped in the fourth clamping groove.

12. The long-stroke trigger switch with an instantaneous structure according to claim 4, wherein the switch also comprises a first metal sheet arranged between the bottom of the movable sliding block and the base body, and the movable sliding block can slide on the first metal sheet;

wherein the movable contact assembly also comprises a second metal sheet, and the second metal sheet can slide in the clamping groove of the movable sliding block, wherein the first metal sheet is arranged on the base body, and wherein the movable sliding block is provided with a connecting column, and the second metal sheet is arranged in the movable sliding block through the connecting column.

13. The long-stroke trigger switch with an instantaneous structure according to claim 5, wherein the switch also comprises a first metal sheet arranged between the bottom of the movable sliding block and the base body, and the movable sliding block can slide on the first metal sheet, wherein the movable contact assembly also comprises a second metal sheet, and the second metal sheet can slide in the clamping groove of the movable sliding block, wherein the first metal sheet is arranged on the base body, and wherein the movable sliding block is provided with a connecting column, and the second metal sheet is arranged in the movable sliding block through the connecting column.

14. The long-stroke trigger switch with an instantaneous structure according to claim 2, wherein a third metal sheet is arranged between the top of the push shaft insert block and the upper cover, and the push shaft insert block can slide on the third metal sheet, and wherein the third metal sheet is arranged on the upper cover.

15. The long-stroke trigger switch with an instantaneous structure according to claim 3, wherein a third metal sheet is arranged between the top of the push shaft insert block and the upper cover, and the push shaft insert block can slide on the third metal sheet, and wherein the third metal sheet is arranged on the upper cover.

16. The long-stroke trigger switch with an instantaneous structure according to claim 1, wherein a second metal sheet groove is formed in the bottom of the second metal sheet, the movable sliding block is provided with a first connecting position, and the second metal sheet groove is arranged on the first connecting position, and wherein a movable contact groove is formed in the bottom of the movable contact, the movable sliding block is provided with a second connecting position, and the movable contact groove is arranged on the second connecting position.

17. The long-stroke trigger switch with an instantaneous structure according to claim 1, wherein a second metal sheet groove is formed in the bottom of the second metal sheet, the movable sliding block is provided with a first connecting position, and the second metal sheet groove is arranged on the first connecting position, and wherein a movable contact groove is formed in the bottom of the movable contact, the movable sliding block is provided with a second connecting position, and the movable contact groove is arranged on the second connecting position.

* * * * *